No. 843,824. PATENTED FEB. 12, 1907.
E. A. JOHNSTON.
HAY LOADER.
APPLICATION FILED OCT. 13, 1906.
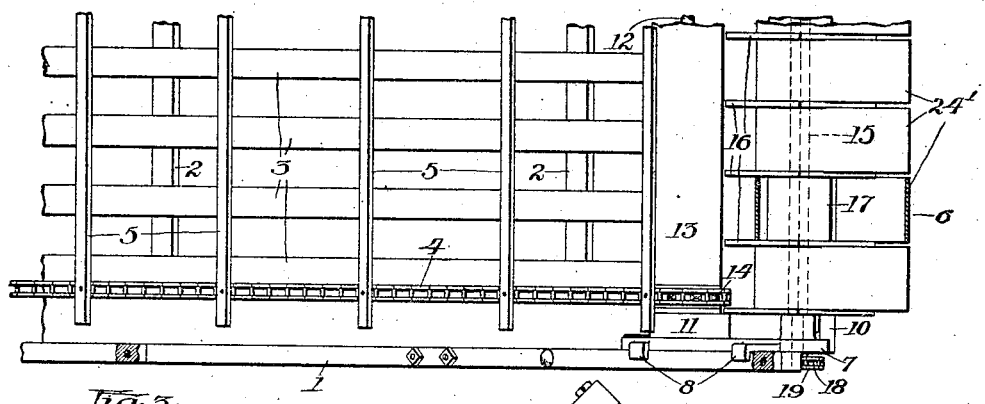
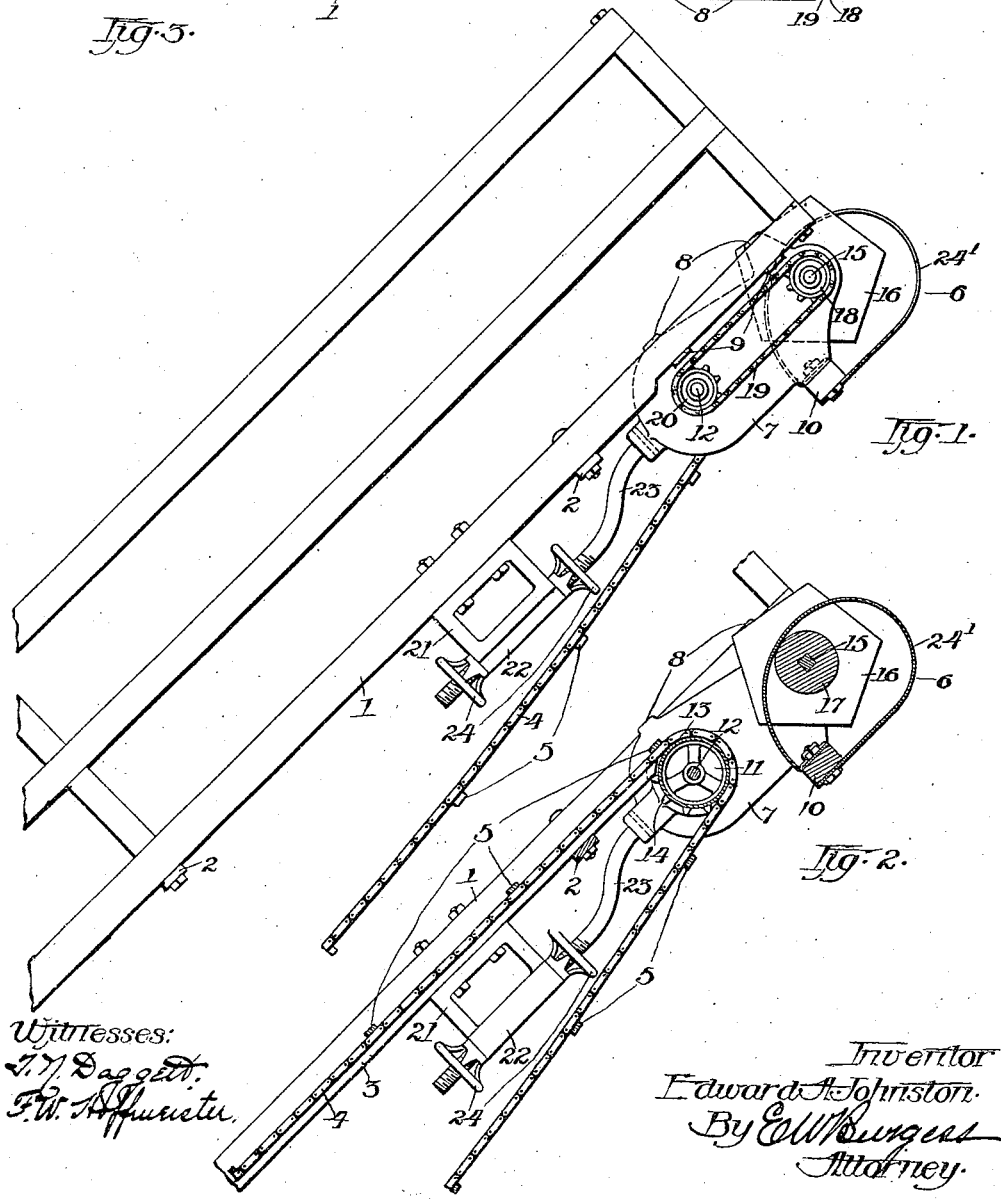

UNITED STATES PATENT OFFICE.

EDWARD A. JOHNSTON, OF STERLING, ILLINOIS, ASSIGNOR TO INTERNATIONAL HARVESTER COMPANY, A CORPORATION OF NEW JERSEY.

HAY-LOADER.

No. 843,824.     Specification of Letters Patent.     Patented Feb. 12, 1907.

Application filed October 13, 1906. Serial No 338,692.

*To all whom it may concern:*

Be it known that I, EDWARD A. JOHNSTON, a citizen of the United States, residing at Sterling, in the county of Whiteside and State of Illinois, have invented certain new and useful Improvements in Hay-Loaders, of which the following is a specification.

My invention relates to improvements in hay-loaders in which endless carriers are operatively supported upon inclined carrier-frames and operate to deliver the hay upon the wagon; and the object of my invention is to provide a supplemental forwarding mechanism adapted to receive the hay from the delivery end of the carrier and deposit it upon the load in a manner to prevent the return portion of the carrier from dragging the hay downward from the load toward the receiving end of the carrier. I attain this object by the mechanism illustrated in the accompanying drawings, in which—

Figure 1 is a side elevation of the delivery end of a carrier embodying my invention. Fig. 2 is a side elevation of a part of Fig. 1, showing part of the supplemental carrier in section; and Fig. 3 is a top plan view of a part of Fig. 1.

Similar numerals refer to similar parts throughout the several views.

The carrier-frame is one having a common form, comprising side members 1, connected by means of transverse bars 2, upon which are secured the slats 3, forming a support for the endless carrier, comprising endless chains 4, upon opposite sides of the carrier-frame and connected by means of the usual cross-bars 5.

6 represents a carrier-frame having side members 7, provided with outwardly-projecting lip portions 8, adapted to rest upon the upper side of the carrier-frame members 1, and other outwardly-projecting lip portions 9, located below the members 1, the two series of lips forming between them a channel for the reception of the frame member 1 in a manner to allow the frame 6 to be moved longitudinally relative to the carrier-frame.

10 represents a transverse bar, having its opposite ends secured to the members 7 of the frame 6. Journaled in bearings 11 at the rear ends of the members 7 is a transverse shaft 12, having a roller 13 secured to its body portion and sprocket-wheels 14 at opposite ends thereof to receive the endless chains of the carrier in the common way.

At the forward or delivery end of the members 7 is journaled a transverse shaft 15, having a series of angular plates 16 mounted thereon and spaced apart by means of sleeves 17. At one or both ends of the shaft are secured sprocket-wheels 18, having sprocket-chains 19 connecting them with sprocket-wheels 20, secured to the opposite ends of the shaft 12 in a manner to transmit motion from the shaft 12 to the shaft 15.

For the purpose of moving the frame 6 along the carrier-frame there are depending brackets 21, secured to the side members of the carrier-frame, the brackets having sleeve portions 22, adapted to receive the rear ends of bars 23, the forward ends of the bars being secured to the side members 7 of the frame 6. The rear ends of the bars are threaded, and 24 represents hand-wheels engaging with the threaded portions at opposite ends of the sleeves in a manner to adjust the bars in either direction.

A series of curved strippers 24' are secured to the transverse bar 10 and are designed to extend across the spaces between the angular plates 16. One end of each stripper is secured to the top of the bar 10, and then they are curved upward and forward above the sleeves and between the plates to a point beyond the path of the forward rotation of the plates and then downward and rearward to the lower side of the bar 10, where they are secured.

In operation the hay is delivered by the endless carrier to the supplemental forwarding device, and the angular plates operate to deliver it upon the load, and the strippers prevent any being drawn rearward to engage with the return portion of the carrier and be moved backward off the load.

What I claim as being my invention, and desire to secure by Letters Patent, is—

1. In a hay-loader the combination of a carrier-frame, an endless carrier mounted upon said frame and adapted to convey the hay toward the delivery end of said loader, a supplemental forwarding device operatively connected with said endless carrier at its delivery end in a manner to receive the hay therefrom, said supplemental forwarding device comprising a rotatable shaft having a series of angular plates mounted thereon and having a series of strippers mounted between the plates.

2. In a hay-loader the combination of a carrier-frame, an endless carrier mounted upon said frame and adapted to convey the hay toward the delivery end of said loader, a supplemental forwarding device operatively connected with said endless carrier at its delivery end in a manner to receive the hay therefrom, said supplemental forwarding device comprising a longitudinally-movable frame mounted upon the delivery end of said carrier-frame, a rotatable shaft mounted in said supplemental frame, said shaft having a series of angular plates mounted thereon and a series of strippers mounted between the plates.

3. In a hay-loader the combination of a carrier-frame, an endless carrier mounted upon said frame and adapted to convey the hay toward the delivery end of said loader, a supplemental forwarding device operatively connected with the delivery end of said endless carrier, said device comprising a frame supported upon said carrier-frame at its delivery end, rearwardly-extending bars secured to said supplemental frame, depending brackets secured to said carrier-frame and adapted to receive the rear ends of said bars, and means for adjusting the bars longitudinally relative to the brackets.

4. In a hay-loader the combination of a carrier-frame, said frame comprising side members, an endless carrier mounted upon said frame and adapted to convey the hay toward the delivery end of said loader, a supplemental forwarding device operatively connected with the delivery end of said endless carrier, said device comprising a frame having side members, said side members connected by means of a transverse bar, outwardly-projecting lips integral with said side members and forming a channel in which is received the delivery ends of the side members of said carrier-frame, a transverse shaft mounted at the rear ends of the side members of the supplemental forwarding device and adapted to receive one end of said endless carrier, a transverse shaft mounted at the opposite end of said side members, hay-forwarding members secured to said last-mentioned shaft, means for transmitting motion to said shaft, and means for moving said supplemental forwarding device bodily in a longitudinal direction relative to the endless carrier frame.

EDWARD A. JOHNSTON.

Witnesses:
E. R. Thompson,
F. F. Ward.